Figure 1:
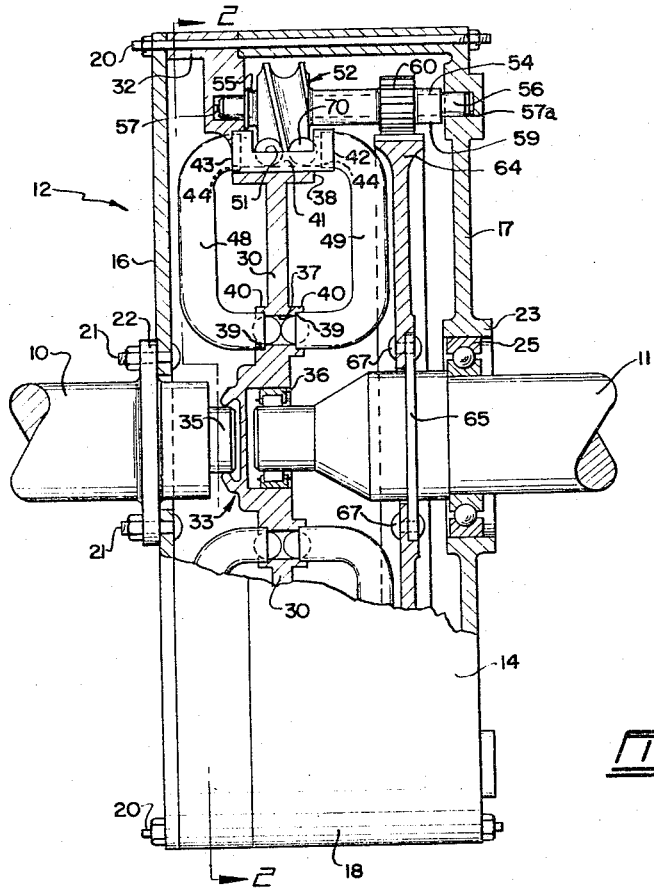

April 18, 1967 H. J. C. RICKARD 3,314,309

INERTIA COUPLING APPARATUS

Filed March 1, 1965 2 Sheets-Sheet 1

INVENTOR
HUGH J. C. RICKARD
BY
Fetherstonhaugh & Co.
ATTORNEYS

April 18, 1967   H. J. C. RICKARD   3,314,309
INERTIA COUPLING APPARATUS
Filed March 1, 1965   2 Sheets-Sheet 2

INVENTOR
HUGH J.C. RICKARD

United States Patent Office 3,314,309
Patented Apr. 18, 1967

3,314,309
INERTIA COUPLING APPARATUS
Hugh J. C. Rickard, 116 E. Carisbrook Road
North Vancouver, British Columbia, Canada
Filed Mar. 1, 1965, Ser. No. 436,028
6 Claims. (Cl. 74—752)

This invention relates to coupling apparatus and in particular to a coupling apparatus wherein an inertia mass is utilized to transmit torque from a driving to a driven shaft. In the transference or transmission of power from one shaft to another wherein it is necessary or advisable to permit the driving of a shaft to attain certain rotational speeds before making a direct connection between the driven and driving shaft, coupling or transmission apparatus have been developed whereby the torque produced by the rotating drive shaft may be gradually transferred to the driven shaft to build up the latter speed before the direct connection between the two is made. It has been common practice to utilize either the friction clutch or a fluid type clutch. The former type depending upon friction between moving parts ultimately destroys itself, whereas the latter type slips indefinitely, the slippage representing a continuous loss of power.

The present invention seeks to overcome the objections of couplings employing the friction clutch or fluid clutch by utilizing the inertia of movable masses as they are moved between low and high speeds to gradually transfer torque from a driving shaft to a driven shaft.

The present invention provides a coupling which, while permitting slippage during the initial period of acceleration of the driven shaft will, when the driven shaft has reached a predetermined speed, operate to lock both shafts together for a slip free drive.

The present invention also provides a coupling which does not depend upon friction between relatively moving parts to transfer torque from one part to the other and which therefore is not subject to wear or loss of efficiency due to the production of heat.

The present invention further seeks to provide a coupling which permits simple and rugged construction of its movable parts so that no adjustment is required during its lifetime.

In accordance with the above, the present invention comprises a sun gear connected to a driven member for rotation therewith, at least one planetary gear mounted for idling on a driving member and engaged with the sun gear, an endless tube formed as a single loop fixedly mounted on the driving member for rotation therewith, said tube being located to one side of said driving member's rotational axis with the plane of its loop extending radially to the latter, said tube being partially cut away at its radially outermost side to form an opening therein, a series of balls held loosely in the tube, a fine threaded worm connected to the planetary gear for rotation therewith and having a portion extending into the opening in the tube to engage with the balls, said worm having a pitch greater than the diameter of the balls so as to space apart any of the latter simultaneously engaged with said worm.

Figure 3:
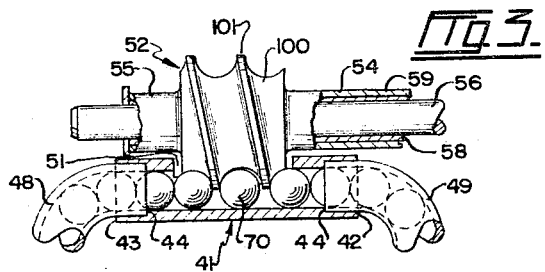
Figure 2:
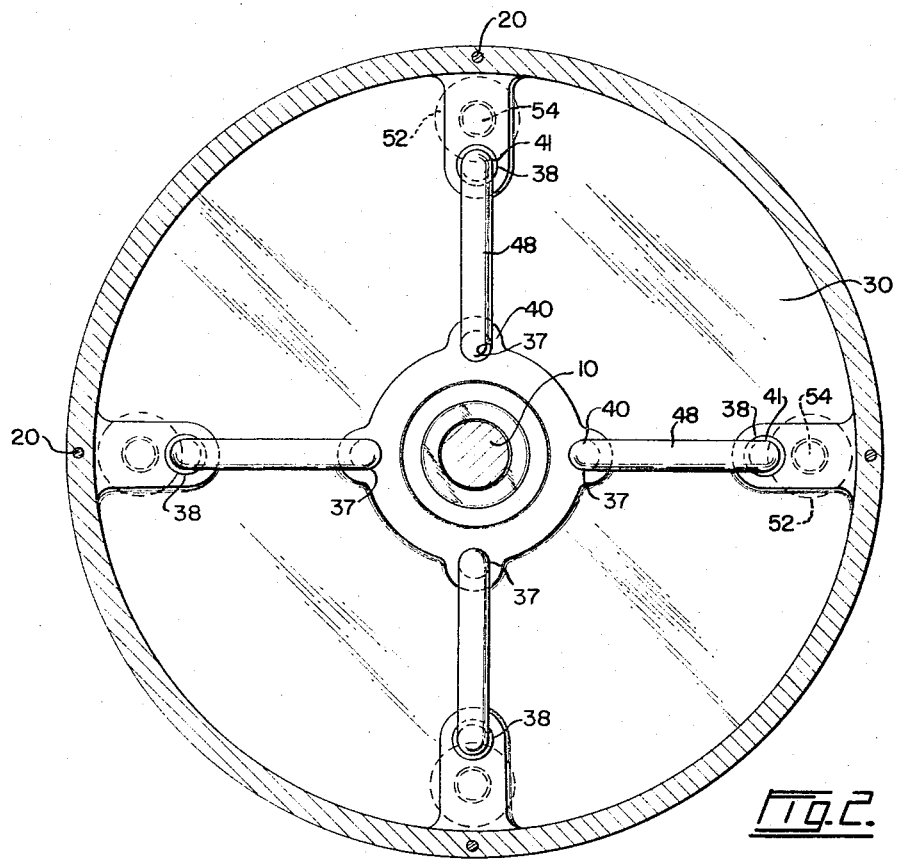
Figures 4, 5:
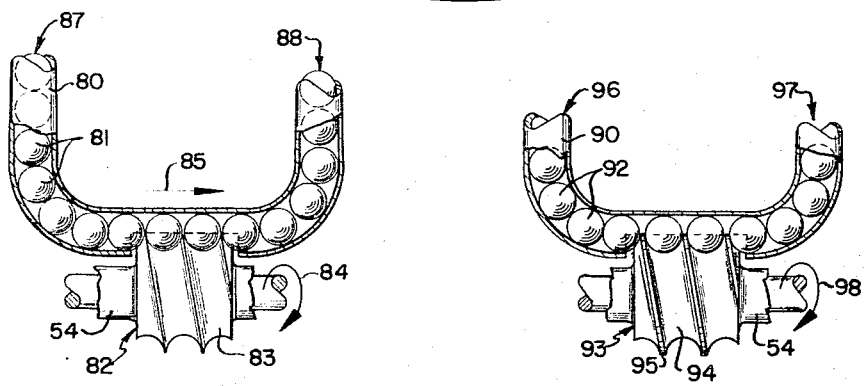

In the drawings which illustrate the invention,
FIGURE 1 is a side view partially in section of the inertia coupling constructed in accordance with the teaching of the present invention,
FIGURE 2 is an end view of the invention taken along line 2—2 of FIGURE 1,
FIGURE 3 is an enlarged fragmentary view of the worm and balls of FIGURE 1,
FIGURE 4 is a diagrammatic view of the worm and balls of FIGURE 1 in a non-operative relationship, and
FIGURE 5 is a diagrammatic view showing the operative relationship of the worm and balls of FIGURE 4.

Referring to the drawings and specifically to FIGURE 1, there is shown a shaft 10, hereinafter in both the specification and claims called the driving shaft, which is connected to some suitable source of power, not shown. Aligned with shaft 10 is a shaft 11, hereinafter in both the specification and claims referred to as the driven shaft and which normally operates under a load. This shaft 11 may be the drive shaft associated with automobiles and the like or may be an operating shaft directly connected to a heavy industrial machine operating therefore under loaded conditions at all times.

The coupling apparatus herein accorded the numeral 12 comprises an annular casing 14 having end walls 16 and 17 respectively and a peripheral wall 18. This casing may be constructed as one unit, however, in order to permit ease of assembly of the coupling, the peripheral wall 18 may be formed as an integral part of end wall 17, and end wall 16 connected thereto by means of shafts or bolts 20. The end wall 16 is annular and embraces drive shaft 10 and is non-rotatably secured thereto, being bolted as at 21 to a radially extending flange 22, the latter being either welded to or formed integrally with said shaft 10.

The end wall 17 is also annular having an axially located sleeve 23, the latter being provided with suitable annular bearings 25 rotatably embracing the driven shaft 11. With this construction it will be seen that the shafts 10 and 11 and the annular casing 14 are maintained in coaxial relationship.

Secured inside the casing 14 is a circular carrier plate 30. This plate is of substantially the same diameter as end wall 16 and extends between the latter and peripheral wall 15. The bolts 20 extend through suitable bolt holes 32 formed in the plate 30, maintaining said plate non-rotatable and fixed relative to the casing.

This carrier plate also has an offset central circular portion 33 which forms an annular seat for a reduced end portion 35 formed at the end of shaft 10. This plate is also provided with roller bearing 36 in which a free end of the driven shaft 11 is rotatably journalled. It will be seen that the construction of the casing and carrier plate, together with the provision of the bearings as hereinbefore illustrated and described, further serves to maintain axial alignment of the shafts 10 and 11 and the casing 14.

The carrier plate 30 is provided with sets of bores 37 and 38 of the same diameter. In FIGURE 4, four sets of bores 37 and 38 and structure attendant thereto are illustrated, but in the specification following, only one set of these bores and their associated structures will be referred to. These bores 37 and 38 are spaced apart and lie on the same line of radius on one side of the rotational axis of the driving shaft 10, and their axes are parallel therewith. Encircling the bore 37 at each side of the carrier plate 30, are annular thickened portions or bosses 40. These bosses are counterbored coaxially with said bore to form a pair of outwardly facing shoulders 39. At the bore 38, however, there is provided an annular sleeve 41 extending from one side of the plate, said sleeve may be integrally cast with the plate and has an inside diameter the same as bore 37. The sleeve is counterbored at its ends 42 and 43 in the same manner as the bosses 40 to again provide a pair of outwardly facing shoulders 44. The counterbored portions of bosses 40 and sleeve 41 accept the ends of a pair of U-shaped heavy steel tubes 48 and 49, said tubes having the same internal diameter as the bore 37 and sleeve 41 so that an endless single looped tube is formed. The central portion of the annular sleeve 41 is partially cut away as at 51 to receive a cylindrical worm 52, the latter extending to about the center of the tube thus formed. This worm 52 is mounted on or formed as an integral part of an elongated sleeve 54 adjacent one end 55 of the latter, the sleeve 54 being mounted for rotation on an elongated shaft 56. This shaft 56 extends at each end into blind sockets 57 and 57a formed in the carrier plate 30 and end wall 17 respectively, and is arranged so that it lies parallel to the axis of the driving shaft 10. A sleeve bearing 58 is located between the shaft 56 and the sleeve 54 to ensure friction free rotation of the latter. This sleeve 54 has secured near its end 59, a planetary gear 60. This planetary gear is affixed non-rotatably to the sleeve and may be formed as an integral part thereon by any of a number of known means. The planetary gear 60 is arranged to mesh with the peripheral teeth of a sun gear 64, the latter being secured to the driven shaft 11 for rotation therewith. As shown in FIGURE 1, the driven shaft is provided with a peripheral flange 65 to which the sun gear is secured by rivets 67.

A series of steel balls 70 all of the same diameter and all being of a little smaller diameter than the diameter of the tube formed by the U-shaped members 48 and 49 and the bore 37 and sleeve 41, so that they have a snug yet slidable fit therein and which are arranged as hereinafter to be described to mesh with the worm 52.

The configuration of the worm 52 and its relationship as to size with the balls 70 is extremely important as it is upon this relationship that the proper operation of the coupling depends.

The above-mentioned relationship may best be illustrated and described with reference to FIGURES 4 and 5 of the drawings. In FIGURE 4 there is illustrated diagrammatically, a vertically arranged tubular passage 80 which is filled with an endless series of balls 81, the length of the passage and the number and diameter of the balls being such that each one of the balls touches the balls adjacent thereto. Arranged at the bottom of the passage so as to extend thereinto, is a driven worm 82 having a helical groove 83 arranged to fittedly seat a plurality of balls 81 whereby, when the worm is rotated in the direction as shown by the arrow 84, the balls will be driven in the direction as shown by the arrow 85. As the passage 80 is filled with the balls, the weight of the balls in each of the columns 87 and 88 are the same, and as the balls touch one another it will therefore require no work other than the friction of the balls upon the sides of the passageway to move them around as an endless chain. It therefore results that aside from the friction between the worm and the balls, the worm will not be called upon to do any work when rotated to move the balls as aforesaid.

A similar arrangement of a vertically oriented endless passageway 90, balls 92 and worm 93, is illustrated in FIGURE 5. However, worm 93 is different to worm 82 in that the helical groove 94 has a greater pitch than the diameter of the balls 92, the turns of the groove being separated by flats 95. Worm 93 will therefore maintain the balls which are at one time associated or engaged therewith spaced apart. Each of the vertical columns 96 and 97 of the balls will therefore be supported by the worm 93 and not by each other as are the similar stacks of balls 82 in passage 80. The worm 93 has also a fine threaded slope preferably extending at an angle of less than 10 degrees to the axis of said worm, whereby neither of the columns of balls 96 and 97 acting alone will cause it to rotate. This resistance to rotation is common in many apparatus in which a worm is employed, for example, the resistance to rotation of the worm in a screw jack against any weight applied hereto.

It will be observed therefore that although the stack of balls in column 96 does not lend assistance to rotate the worm if rotated in the direction as shown by the arrow 98, must have some torque applied thereto in order to lift the column of balls in column 97.

Referring now to FIGURES 1 and 3, the worm 52 is formed in the manner of the worm 93, having a semi-circular helical groove 100 of substantially the same diameter as the balls 70 so that the latter have a snug fit with the former. The helical groove 100 is separated by flats 101 between each convolution so that the pitch of the worm is of a greater distance than the diameter of the balls 70. This configuration of the worm relative to the balls therefore ensures separation of any of the balls at one time engaged with the worm in the manner of the engagement of the worm 93 with the balls 92.

In describing the operation of the coupling in a manner in which it transfers the torque from driving shaft 10 to driven shaft 11, it will be first assumed that both shafts 10 and 11 are at rest, with shaft 11 having a direct connection to a load. With the application of a force to shaft 10, this shaft commences to rotate. However, as shaft 11 is held immobile by the load, the sun gear 64 being meshed with the planetary gear 60 will cause the latter to rotate and, consequently, rotate the worm 52, thereby moving the balls 70 around the tube formed by the U-shaped members 48 and 49 in the nature of a column of fluid. The rotation of the shaft 10 results in the rotation of the tube and with it the balls around the shaft 10 axis. The centrifugal force outwardly from the axis of shaft 10 imparted to the balls will force each of the column of balls held in members 48 and 49 against the worm 52, the action of the balls from the worm being analogous to the action of the balls 92 upon the worm 93. It will be seen therefore that the faster shaft 10 rotates, the greater will be the force of the balls 70 on both sides of the worm, and the greater therefore will be the torque required by the worm to move one column of the balls inwardly towards the axis of the shaft against the centrifugal force outwardly. This torque is transferred to the sun gear through the planetary gear and thence to the driven shaft 11 to commence rotation of the latter. It will be seen that increased acceleration of rotational speed of the driving shaft 10 will result in increased torque being applied to the shaft 11. In other words, as the shaft 10 speeds up to increase the torque necessary to rotate the worm, the rotation of the planetary gear slows down, and when said torque necessary to turn the worm equals the torque necessary to rotate shaft 11 against the load, the rotation of the planetary gear and with it the worm will stop so that the drive between shaft 11 and shaft 10 is slip free and one hundred percent efficient.

It will be realized, of course, that during acceleration of the shaft 11 there will be relative movement of the parts of the coupling as hereinbefore described with the consequent production of heat and the like. It is therefore contemplated that the entire casing 14 shall be filled with a lubricating oil which not only serves to properly lubricate the parts, but also serves to dissipate any heat caused by friction therebetween.

What I claim as my invention is:

1. An inertia coupling for operatively connecting a pair of relatively rotatable coaxially aligned members comprising a sun gear connected to a driven member for rotation therewith, at least one planetary gear mounted for idling on a driving member and engaged with the sun gear, an endless tube formed as a single loop fixedly mounted on the driving member for rotation therewith, said tube being located to one side of the rotational axis of said driving member with the plane of its loop extending radially to the latter, said tube being partially cut away at its radially outermost side to form an opening therein, a series of balls held loosely in the tube, a fine threaded worm connected to the planetary gear for rotation therewith and having a portion extending into the opening in the tube to engage the balls, said worm having a pitch greater than the diameter of the balls so as to space apart any of the latter simultaneously engaged with said worm.

2. An inertia coupling as claimed in claim 1 in which the tube holds the sufficient balls so that at least two of these are engaged with the worm at one time.

3. An inertia coupling for operatively connecting a pair of relatively rotatable coaxially aligned members comprising a sun gear connected to a driven member for rotation therewith, at least one planetary gear mounted for idling on a driving member and engaged with the sun gear, an endless tube formed as a single loop fixedly mounted on the driving member for rotation therewith, said tube being located to one side of the rotational axis of said driving member with the plane of its loop extending radially relative to the latter, said tube being partially cut away at its radially outermost side to form an opening therein, a series of balls held loosely in the tube, a fine threaded worm connected to the planetary gear for rotation therewith and having a portion extending into the opening in the tube to engage with the balls, said worm having semi-circular grooves of the same diameter as the balls and flats between the grooves so as to space apart any of the balls simultaneously engaged at one time with the worm, the length of tube and the number of balls being so related so that at least two of the latter will be in engagement with the worm at one time.

4. An inertia coupling as claimed in claim 3 in which the slope of the worm is less than 10 degrees.

5. An inertia coupling for operatively connecting a pair of relatively rotatable coaxially aligned members comprising a sun gear connected to a driven member for rotation therewith, at least one planetary gear mounted for idling on a driving member and engaged with the sun gear, a series of loose balls, a fine threaded worm connected to the planetary gear for coaxial rotation therewith and engaged with the balls for driving the latter, means to guide the balls from one side of the worm towards the rotational axis of the driving member and to return them to the other side of the worm, said worm having its threads arranged so that they space the balls apart as said balls are passed from one side of the worm to the other.

6. An inertia coupling as claimed in claim 5 in which said means comprises an endless tube formed as a single loop having an internal diameter sufficient to permit the balls to freely roll therethrough, said tube having a cut away portion to receive a portion of the worm so as to permit the latter to engage the balls.

References Cited by the Examiner
UNITED STATES PATENTS

| | | | |
|---|---|---|---|
| 1,909,191 | 5/1933 | Stafford | 74—752 |
| 1,941,141 | 12/1933 | Roth | 103—125 |
| 2,553,505 | 5/1951 | Miner | 74—230.17 |
| 2,749,761 | 6/1956 | Mackia | 74—216.3 |

DAVID J. WILLIAMOWSKY, *Primary Examiner.*

J. R. BENEFIEL, *Assistant Examiner.*